(12) United States Patent
Garapati et al.

(10) Patent No.: US 12,093,799 B2
(45) Date of Patent: *Sep. 17, 2024

(54) SYSTEM AND METHOD FOR EVALUATING THE PERFORMANCE AND USAGE OF A QUESTION ANSWERING COGNITIVE COMPUTING TOOL

(71) Applicant: STATE FARM MUTUAL AUTOMOBILE INSURANCE COMPANY, Bloomington, IL (US)

(72) Inventors: Sunitha Garapati, Normal, IL (US); Matt Floyd, Alpharetta, GA (US); Darcy Bogle, Bloomington, IL (US); Oscar Rebollo Martinez, Chicago, IL (US); Shawn Perrone, Normal, IL (US); Adam Hellman, Cape Girardeau, MO (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,854

(22) Filed: Jan. 13, 2023

(65) Prior Publication Data

US 2023/0169303 A1 Jun. 1, 2023

Related U.S. Application Data

(63) Continuation of application No. 15/599,127, filed on May 18, 2017, now Pat. No. 11,574,162.

(60) Provisional application No. 62/354,401, filed on Jun. 24, 2016.

(51) Int. Cl.
*G06N 3/006* (2023.01)
*G06N 7/01* (2023.01)

(52) U.S. Cl.
CPC ............... *G06N 3/006* (2013.01); *G06N 7/01* (2023.01)

(58) Field of Classification Search
CPC ..... G06N 3/006; G06N 7/01; G06F 16/24522
See application file for complete search history.

(56) References Cited

U.S. PATENT DOCUMENTS 9,633,309 B2 4/2017 Giffels et al.
10,037,491 B1 7/2018 Fang et al.
2012/0173992 A1 7/2012 D'Angelo et al.
2014/0272909 A1 9/2014 Isensee et al.
(Continued)

*Primary Examiner* — Benjamin P Geib
(74) *Attorney, Agent, or Firm* — Lee & Hayes, P.C.

(57) ABSTRACT

A system and method for evaluating the performance and usage of a cognitive computing tool which answers questions from users. A log file for these interactions includes the questions, the answers and a confidence rating assigned by the tool to each answer. Questions and answers are analyzed to determine validity, accuracy, and categories by subject matter experts or text analytics tools, and the results are added to the log file. Comments and sentiments from users may be analyzed and added to the log file. Additional data about the users, such as identities, demographics, and locations, may be added. Data from the log file may be presented in a dashboard display as metrics, such as trends and comparisons, describing the usage and performance of the cognitive computing tool. Answers may be displayed as they were presented to the users. Selectable filters may be provided to control the data displayed.

20 Claims, 10 Drawing Sheets

(56) References Cited

U.S. PATENT DOCUMENTS

| | | |
|---|---|---|
| 2014/0280087 A1* | 9/2014 | Isensee ............. G06F 16/24578 |
| | | 707/723 |
| 2015/0331601 A1 | 11/2015 | Rosenberg |
| 2016/0196491 A1 | 7/2016 | Chandrasekaran et al. |
| 2017/0004204 A1 | 1/2017 | Bastide et al. |
| 2017/0109390 A1 | 4/2017 | Bradley et al. |
| 2017/0124157 A1 | 5/2017 | Keohane et al. |
| 2017/0140289 A1 | 5/2017 | Block et al. |
| 2017/0140474 A1* | 5/2017 | Tran ............... G06Q 10/063112 |
| 2017/0364806 A1 | 12/2017 | Boyer |

* cited by examiner

SYSTEM AND METHOD FOR EVALUATING THE PERFORMANCE AND USAGE OF A QUESTION ANSWERING COGNITIVE COMPUTING TOOL

CROSS-REFERENCE TO RELATED APPLICATIONS

This present U.S. patent application is a continuation of U.S. patent application Ser. No. 15/599,127, entitled "SYSTEM AND METHOD FOR EVALUATING THE PERFORMANCE AND USAGE OF A QUESTION ANSWERING COGNITIVE COMPUTING TOOL", which claims benefit of the filing date of U.S. Provisional Patent Application No. 62/354,401, filed Jun. 24, 2016, entitled "SYSTEM AND METHOD FOR EVALUATING THE PERFORMANCE AND USAGE OF A QUESTION ANSWERING COGNITIVE COMPUTING TOOL." The entire content of the identified prior-filed applications are hereby incorporated by reference into the present application as if fully set forth herein.

FIELD OF THE DISCLOSURE

The present disclosure generally relates to systems and methods for evaluating the performance of a cognitive computing tool, and more particularly, to a system and method for evaluating a question answering cognitive computing tool using various metrics based upon information from log files and other sources.

BACKGROUND

Question answering cognitive computing tools are designed to answer questions posed in natural language. Typically, to evaluate the performance of such a tool, a number of carefully prepared questions are presented to the tool, and the answers provided by the tool are analyzed. One problem with this method of evaluation is that the carefully prepared questions may not fully represent many of the questions that might actually be asked by ordinary users.

Further, cognitive computing tools output a series of log files that include detailed information about user interactions but that are difficult to parse and understand in a given format, and evaluating the performance of the tools consists of manually reviewing this raw and difficult to understand log data. As a result, such analyses suffer from a number of problems.

As examples, the data may not be easily digestable, which may lead to short-sighted assessments of performance. The correlation of performance with other factors (e.g., location, role, topic) may only be anecdotally measureable. Expert evaluations of performance may not be directly connected with other variables contained in log files. The evaluation of user engagement, capability, and/or aptitude may be limited.

Further, it may be difficult to quantitatively determine whether users are utilizing the tools in the correct manner (with regard to, e.g., keyword searches, out-of-scope inquiries, use of natural language). Usage may not easily be attributed to particular roles and/or locations. It may not be possible to quickly distinguish questions that the tools should be able to answer and questions that they should not or cannot due to insufficient description. There may be no ability to correlate results and/or performance with survey analytics in a meaningful way. It may be difficult to distinguish user perception from reality. There may be inadequate measurement of usage by particular users or user groups of interest, and an inability to measure performance and usage over time. The quantity and configuration of data may make it difficult to determine data trends. Further, it may be difficult to correlate the timing of ground truth enhancements and performance.

BRIEF SUMMARY

Embodiments of the present technology relate to a system and method for evaluating the performance of a question answering cognitive computing tool in order to better understand the usage, performance, and additional training needs of the tool.

In a first aspect, a computer-implemented method may be provided for improving the functionality of a computer, and for evaluating the performance of a cognitive computing tool configured to receive a plurality of questions from one or more users and to provide at least one answer to each question, and may broadly comprise the following actions. A log file stored in an electronic memory for the cognitive computing tool may be accessed. The log file may include the questions, the answers, and a confidence rating assigned by the cognitive computing tool to each answer. Each question may be analyzed to determine a validity of the question, and the results may be added to the log file to create an augmented log file stored in the electronic memory. Each answer may be analyzed to determine an accuracy (and/or degree of correctness) of the answer, and the results may be added to the augmented log file. Each question may be analyzed using a text analytics tool to determine a category of the question, and the results may be added to the augmented log file. At least some of the data in the augmented of file may be formatted by an electronic processor and visually communicated on an electronic display as one or more metrics describing the performance of the cognitive computing tool to provide feedback on cognitive computing tool performance. The computer-implemented method may include additional, less, or alternate actions, including those discussed elsewhere herein.

In a second aspect, a system may be provided for evaluating the performance of a cognitive computing tool configured to receive a plurality of questions from one or more users and to provide at least one answer to each question, and may broadly comprise an electronic memory, an electronic processor, and an electronic display. The electronic memory may contain an augmented log file for the cognitive computing tool. The augmented log file may include the questions, the answers, a confidence rating assigned by the cognitive computing tool to each answer, a validity of each question, and an accuracy of each answer. The electronic processor may analyze each question of the plurality of questions using a text analytics tool to determine a category of the question, and the results may be added to the augmented log file. The electronic display may visually communicate at least some of the data contained in the augmented log file as one or more metrics describing the performance of the cognitive computing tool. The system may include additional, less, or alternate functionality, including that discussed elsewhere herein.

In a third aspect, a non-transitory computer-readable medium with an executable program stored thereon may be provided for evaluating the performance of a cognitive computing tool configured to receive a plurality of questions from one or more users and to provide at least one answer to each question, and may broadly comprise instructions to a system to perform the following actions. A log file stored in an electronic memory for the cognitive computing tool may be accessed. The log file may include the questions, the answers, and a confidence rating assigned by the cognitive computing tool to each answer. Each question may be analyzed to determine a validity of the question, and the results may be added to the log file to create an augmented log file stored in the electronic memory. Each answer may be analyzed to determine an accuracy of the answer, and the results may be added to the augmented log file. Each question may be analyzed using a text analytics tool to determine a category of the question, and the results may be added to the augmented log file. At least some of the data in the augmented of file may be formatted by an electronic processor and visually communicated on an electronic display as one or more metrics describing the performance of the cognitive computing tool. The executable program may include instructions that direct additional, less, or alternate functionality, including that discussed elsewhere herein.

Various implementations of any or all of the foregoing aspects may include any one or more of the following additional features. Analyzing the questions and/or the answers may be performed by an expert in the subject matter of each question and/or answer. Analyzing the answers may include assigning a numerical accuracy rating to the accuracy of the answer. One or more comments by the users may be analyzed, and the results may be added to the augmented log file. One or more sentiments of the users may be analyzed, and the results may be added to the augmented log file. The log file may further include an alias for each user, a timestamp associated with each question, an alternative answer provided by the cognitive computing tool for each question, feedbacks provided by the users, and free text comments provided by the users.

The metrics may include a trend over time regarding the accuracy of the answers provided by the cognitive computing tool. The metrics may include one or more comparisons of the answers, such as a comparison of the numerical accuracy rating to the confidence rating for each answer. Additional data associated with the users may be added to the augmented log file, and the additional information may include demographic data, identities, and/or locations. The answers may be displayed in the same format and as otherwise communicated to the users. Selectable electronic filters may be provided to allow for electronically filtering at least some of the data on the electronic display.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 9 is a depiction of an exemplary seventh display in a user interface communicating information about the performance of the question answering cognitive computing tool; and FIG. 10 is a depiction of an exemplary eighth display in a user interface communicating information about the performance of the question answering cognitive computing tool.

Figure 1:
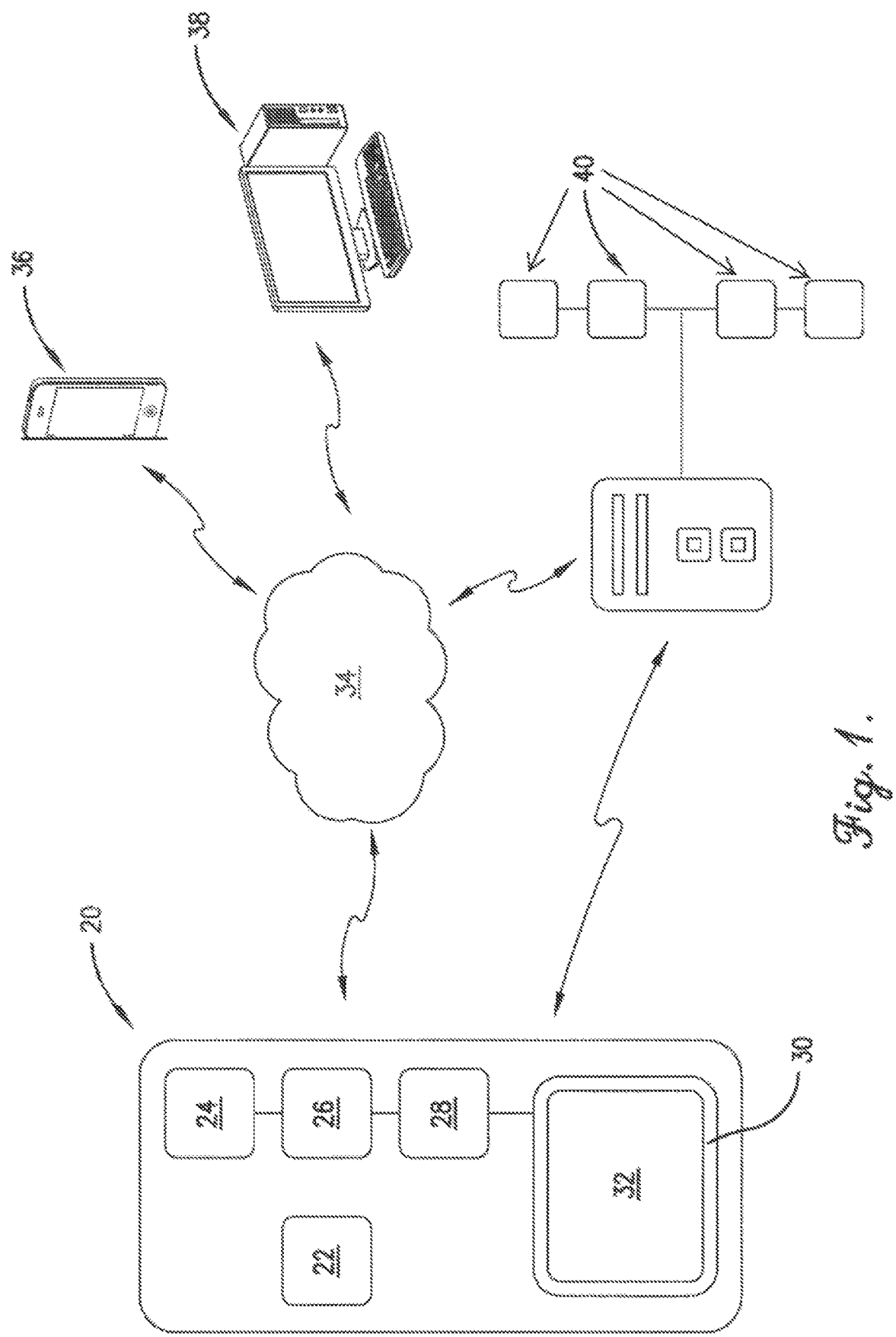
FIG. 1 is a block diagram of an embodiment of an exemplary system for evaluating the performance of a question answering cognitive computing tool.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alfa, systems and methods facilitate evaluating the performance of a cognitive computing tool, and thereby better understanding the usage, performance, and additional training needs of the cognitive computing tool.

Broadly, certain embodiments of the present technology may be used in evaluating the performance of a question answering cognitive computing tool. Cognitive data from log files may be combined with other available non-cognitive data, such as user and/or user group data and evaluations by subject-matter experts, and the combined data may be communicated in a user interface, or "dashboard," to present a multi-dimensional perspective that facilitates better understanding the usage, performance, and additional training needs of the cognitive computing tool.

Embodiments may provide several advantages over the prior art method of manual analysis, including providing a better understanding of usage and performance by visually representing a wide range of relevant and useful data; identifying additional training needs for the cognitive computing tool based upon feedback from users, evaluations by experts, and confidence ratings provided by the tool itself; providing a more comprehensive view of usage and performance in a live environment; and providing an unprecedented perspective on user engagement and ability by overlaying tool data with other available information to generate multi-dimensional views.

Aspects of embodiments may broadly include data synthesis, expert evaluation, and evaluation of the questions posed by users. With regard to data synthesis, rules may be created to use elements of the data to draw additional conclusions about the nature of the questions asked and the answers provided. Comments by users may be analyzed for associated sentiments (i.e., how users felt about their interactions with the cognitive computing tool). Granular data, much of which was unusable in prior art manual analyses, may be used to better understand performance. Embodiments may provide easier transitions between views reflecting different types of data, simultaneous comparisons of multiple variables, flexible configuration to allow measurement tools to evolve with needs, and easier and quicker creation of new views and comparisons.

With regard to expert evaluation, subject-matter experts may analyze answers provided by the cognitive computing tool for a more complete view of the accuracy of these answers as well as user engagement and ability in a live environment. Answers may be graded to provide a better understanding of the accuracy of responses. The evaluation may be combined with other variables to better understand strengths, weakness, and training needs. Greater separation between correct and partially correct responses may be provided. Rules, which may be developed by the experts, may be used to score the quality of questions and/or answers. Tool performance may be overlaid with other available relevant information.

With regard to the evaluation of the questions posed by users to the cognitive computing tool, information may be provided about how effectively users are adapting to the natural language format and whether they properly understand the scope of the project. When evaluating tool performance, particular questions may be identified and excluded if the cognitive tool is not expected to know the answer to them. Relevant non-cognitive data, such as survey and demographic data (from internal or external sources) of users, including but not limited to location and job role, may be used to showcase the usage scenarios and to better understand users and the questions they ask.

Determining performance with regard to particular users or use groups may be useful in identifying the level of value of the tool to those particular users and groups, and possibly taking steps to improve their experiences. For example, the system may allow for determining how useful the tool is to customers seeking answers to their questions, or how useful the tool is to groups, such as call center agents, seeking answers to their own or others' (e.g., customers') questions. Thus, the system allows for improving knowledge management and, ultimately, improving the users' experience.

I. Exemplary System

Referring to FIG. 1, an embodiment of an exemplary computer system 20 is shown for facilitating evaluating the performance of a cognitive computing tool. The system 20 may comprise the cognitive computing tool 22; an electronic communications element 24; an electronic memory 26; an electronic processor 28; and an electronic display 30 for displaying a user interface 32, or "dashboard." An exemplary environment in which the system 20 may operate may include an electronic communications network 34; one or more first electronic devices, such as mobile communications devices 36 and/or computers 38, with which customers and/or other individual users may access the cognitive computing tool via the network 34; and/or one or more second electronic devices, such as networked workstations 40, with which user groups and/or other employees may access the cognitive computing tool via the network 34 and/or directly.

The cognitive computing tool 22 may be one or more computer programs (such as IBM's "Watson") trained or otherwise configured to answer questions from users and/or user groups for a particular business, organization, and/or other endeavor. The cognitive computing tool 22 may generate one or more log files which include information about and/or otherwise document the usage and performance of the tool 22 during interactions with users and/or user groups and/or other operations.

The electronic communications element 24 may be configured to receive questions for the cognitive computing tool 22 from users and/or user groups and to transmit answers for the users and/or user groups from the tool 22 via the electronic communications network 34. The electronic communications element 24 may include one or more transceivers (e.g., WWAN, WLAN, and/or WPAN transceivers) functioning in accordance with IEEE standards, 3GPP standards, or other standards, and configured to receive and transmit data via the electronic communications network 24.

The electronic memory 26 may be configured to store electronic data, including the log files generated by the cognitive computing tool 22. The memory 26 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic processor 28 may be configured to execute the one or more computer programs comprising the cognitive computing tool 22, which may involve accessing data stored on the memory 26 and/or engaging in communication via the electronic communications element 24 in order to perform aspects or steps of the present technology, including analyzing the log files.

The electronic display 30 may be configured to display the dashboard 32 for communicating information, especially various metrics, about the usage and performance of the cognitive computing tool 22.

The electronic communications network 34 may facilitate substantially any type of data communications via any standard or technology (e.g., GSM, CDMA, TDMA, WCDMA, LTE, EDGE, OFDM, GPRS, EV-DO, UWB, WiFi, IEEE 802 including Ethernet, WiMAX, and/or others). The electronic communications network 34 may also support various local area networks (LANs), personal area networks (PAN), or short range communications protocols.

The first electronic devices, which may include the smart phones or other mobile communications devices 36 and/or the computers 38, may be used by customers and/or other individual users to communicate with, including asking questions of and receiving answers from, the cognitive computing tool 22 via the electronic communications network 34. The second electronic devices, which may include the networked workstations 40, may be used by user groups and/or other employees to communicate with, including asking questions of and receiving answers from the cognitive computing tool 22 via the network 34 and/or directly.

Figure 2:
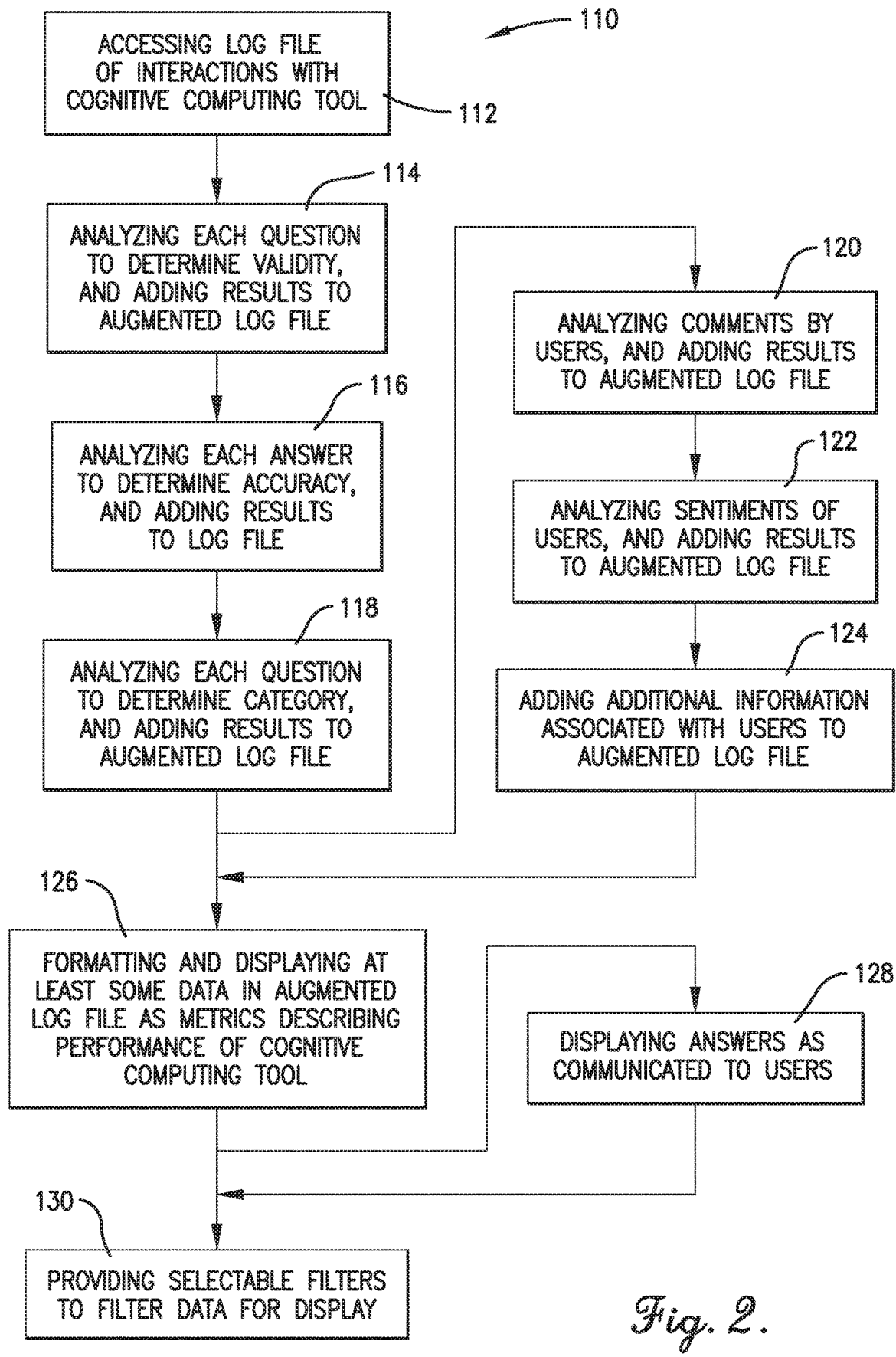
FIG. 2 is a flowchart of an embodiment of an exemplary computer-implemented method for evaluating the performance of the question answering cognitive computing tool.

Referring also to FIG. 2, the system 20 may function as follows. A log file stored in the electronic memory 26 for the cognitive computing tool 22 may be accessed, as shown in 112. The log file may include a plurality of questions asked by one or more users and/or user groups, at least one answer from the tool 22 to each question, and a confidence rating assigned by the tool 22 to the answer to each question. The log file may further include an alias for each user, a timestamp associated with each question, an alternative answer for each question provided by the cognitive computing tool 22, feedback provided by the users, and/or free text comments provided by the users.

Each question may be analyzed to determine a validity of the question, and the results may be added to the log file to create an augmented log file stored in the electronic memory 26, as shown 114. Analyzing the questions may be performed by an expert in the subject matter of each question. Similarly, each answer may be analyzed to determine an accuracy of the answer, and the results may be added to augmented log file, as shown in 116. Analyzing the answers may also be performed by an expert in the subject matter of each question. Analyzing the answers may include assigning a numerical accuracy rating to the accuracy of the answer. Each question may also be analyzed using a text analytics tool to determine a category of the question, and the results may be added to the augmented log file, as shown in 118.

The method 110 may further include analyzing one or more comments by the users, and adding the analysis of the comments to the augmented log file, as shown in 120. The method may further include analyzing one or more sentiments of the users, and adding the analysis of the sentiments to the augmented log file, as shown in 122. The method 110 may further include adding additional data associated with the users to the augmented log file, as shown in 124. This may involve accessing demographic data about the users and adding the demographic data to the augmented log file, adding an identity of each user to the augmented log file, and/or adding a location of each user to the augmented log file.

At least some of the data contained in the augmented log file may be formatted by the electronic processor 28 and visually communicated on the electronic display 30 as one or more metrics describing the usage and performance of the cognitive computing tool 22, as shown in 126. The metrics may include a trend over time regarding the accuracy of the answers provided by the tool 22. The metrics may include comparisons of the answers to each question, and the comparisons may include the numerical accuracy rating assigned to the accuracy of each answer compared to the confidence rating assigned to each answer. The method 110 may further include visually communicating the answers in the formats with which they were communicated to the users, as shown in 128.

The method 110 may further include providing one or more electronic filters which are selectable to cause the electronic processor 28 to electronically filter the at least some of the data visually communicated on the electronic display 30, as shown in 130.

The system 20 may include more, fewer, or alternative components and/or perform more, fewer, or alternative actions, including those discussed elsewhere herein, and particularly those discussed in the following section describing the computer-implemented method.

II. Exemplary Computer-Implemented Method

Referring again to FIG. 2, an embodiment of a computer-implemented method 110 is shown for improving the functioning of a computer for evaluating the performance of the cognitive computing tool 22. The computer-implemented method 110 may be a corollary to the functionality of the system 20 of FIG. 1, and may be similarly implemented using the various components of the system 20 within the above-described exemplary operating environment. Broadly, the method 110 may proceed as follows.

A log file stored in the electronic memory 26 for the cognitive computing tool 22 may be accessed, as shown in 112. For example, a business, organization, or other endeavor employing the tool 22 may request that the vendor of the tool 22 place the log file on a network business-to-business location. The log file may include some, most, or all of the questions asked by one or more users and/or user groups, at least one answer from the tool 22 to each question, and a confidence rating assigned by the tool 22 itself to its answer to each question. The log file may further include an alias for each user, a timestamp associated with each question, an alternative answer for each question provided by the cognitive computing tool 22, feedback provided by the users, and/or free text comments provided by the users.

Each question may be analyzed to determine a validity of the question, and the results may be added to the log file to create an augmented log file stored in the electronic memory 26, as shown 114. Each answer may be analyzed to determine an accuracy of the answer, and the results may be added to augmented log file, as shown in 116. For example, one or more subject-matter experts may score or otherwise analyze the questions and/or the answers for validity and accuracy, respectively. Alternatively, one or both of these analyses may be automated. The accuracy of the valid questions and/or the answers to the valid questions may be rated on a numerical scale, wherein, for example, a greater accuracy and/or validity may result in a higher (or lower) numerical score. Determining whether a question is valid or invalid may involve searching for relevant keywords in the question, and determining whether the user used an appropriate format (e.g., natural language) for asking the question. Questions deemed invalid due to inappropriate format may still be useful to show how well all users, particular users, and/or particular user groups are adapting to using the required format. Further, distinguishing valid from invalid questions may be useful in determining whether additional training of the cognitive computing tool is needed with regard to answering valid questions (the ability or inability to answer invalid questions may not be of any interest).

Each question may also be analyzed using a text analytics tool to determine a category of the question, and the results may be added to the augmented log file, as shown in 118. Assigning the questions to particular topics or other categories facilitates better understanding the performance of the cognitive computing tool with regard to particular topics, and identifying the potential need for additional training in particular topics and/or for directing more resources to answering popular topics.

The method 110 may further include analyzing one or more comments by the users, and adding the analysis of the comments to the augmented log file, as shown in 120. The method may further include analyzing one or more sentiments of the users (i.e., how users felt about their interactions with the tool), and adding the analysis of the sentiments to the augmented log file, as shown in 122. The method 110 may further include adding additional data associated with the users to the augmented log file, as shown in 124. This may involve accessing demographic data about the users and adding the demographic data to the augmented log file, adding an identity of each user to the augmented log file, and/or adding a location of each user to the augmented log file. More broadly, the data in the augmented log file may be supplemented with relevant non-cognitive data, including, for example, internal data available only to the business, organization, or other endeavor.

At least some of the data contained in the augmented log file may be formatted by the electronic processor 28 and visually communicated on the electronic display 32 in the dashboard 32 as one or more metrics describing the performance of the cognitive computing tool 22, as shown in 126. The metrics may include a trend over time regarding the ability of the tool 22 to answer questions, and the accuracy of those answers. The metrics may include comparisons of the answers to each question, and the comparisons may include the numerical accuracy rating assigned to the accuracy of each answer compared to the confidence rating assigned to each answer. Additionally or alternatively, comparisons may be based upon day, time, location, and user feedback. The method 110 may further include visually communicating the answers in the formats with which they were communicated to the users (this information may be found as an html markup in the log file), as shown in 128. The method 110 may further include providing one or more electronic filters which are selectable to cause the electronic processor 28 to electronically filter the at least some of the data visually communicated on the electronic display 30, as shown in 130. The computer-implemented method 110 may perform more, fewer, or alternative actions, including those discussed elsewhere herein.

Figure 3:
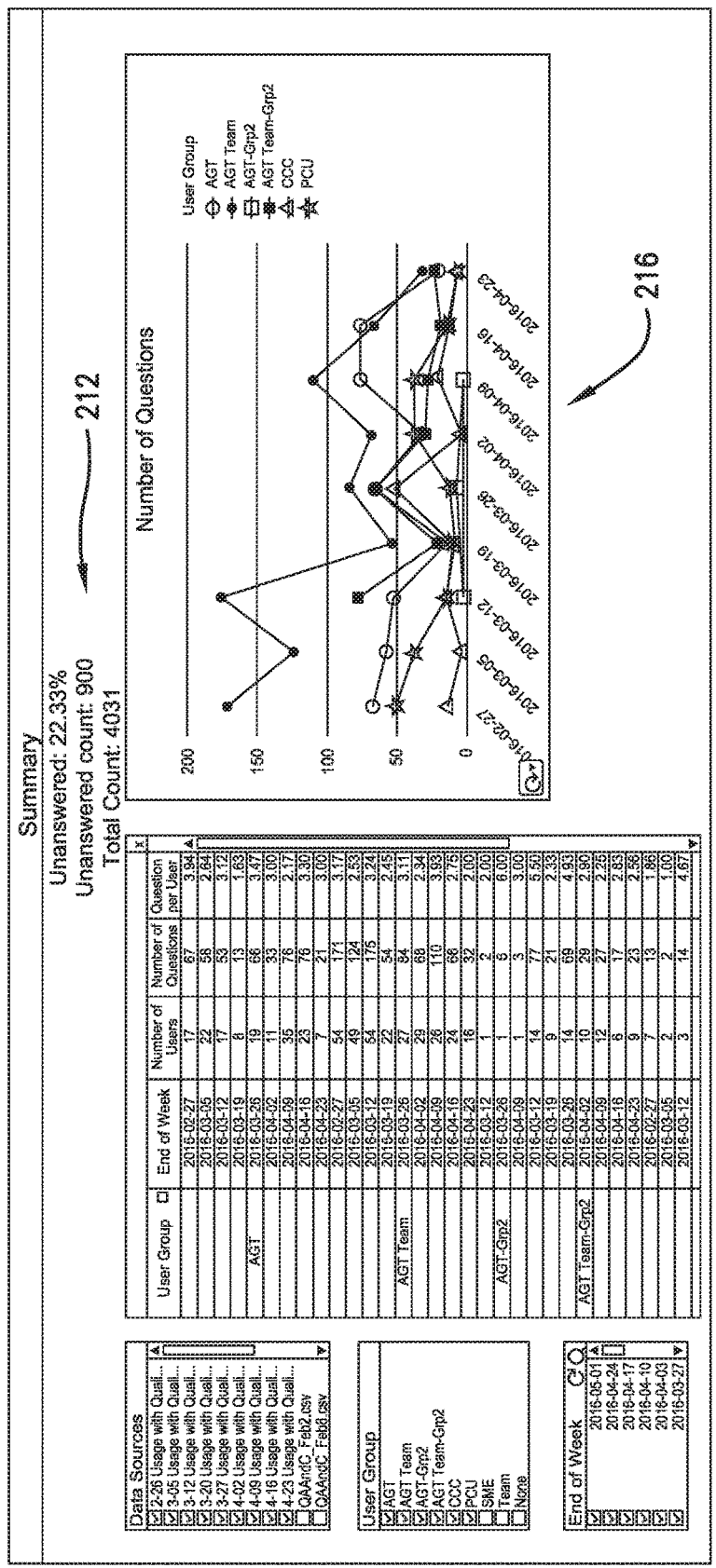
FIG. 3 is a depiction of an exemplary first display in a user interface communicating information about the performance of the question answering cognitive computing tool.

The data communicated in the dashboard 32 may be used to better understand the usage, performance, and additional training needs of the cognitive computing tool 22. Further, other researchers may use the information provided on the dashboard 32 to better understand aspects of interaction of interest to them. With regard to the metrics, referring to FIG. 3, one page 210 of the dashboard 32 may include a high-level summary of the questions and/or answers (e.g., the number of users, the number of questions asked, a summary of the quality of the questions and/or answers), as shown in 212; may indicate which users or groups are using the cognitive computing tool, as shown in 214; and may present one or more metrics over time, as shown in 216. The dashboard 32 may also present selectable filters to allow users to view particular data of interest, as shown in 218.

Figure 4:
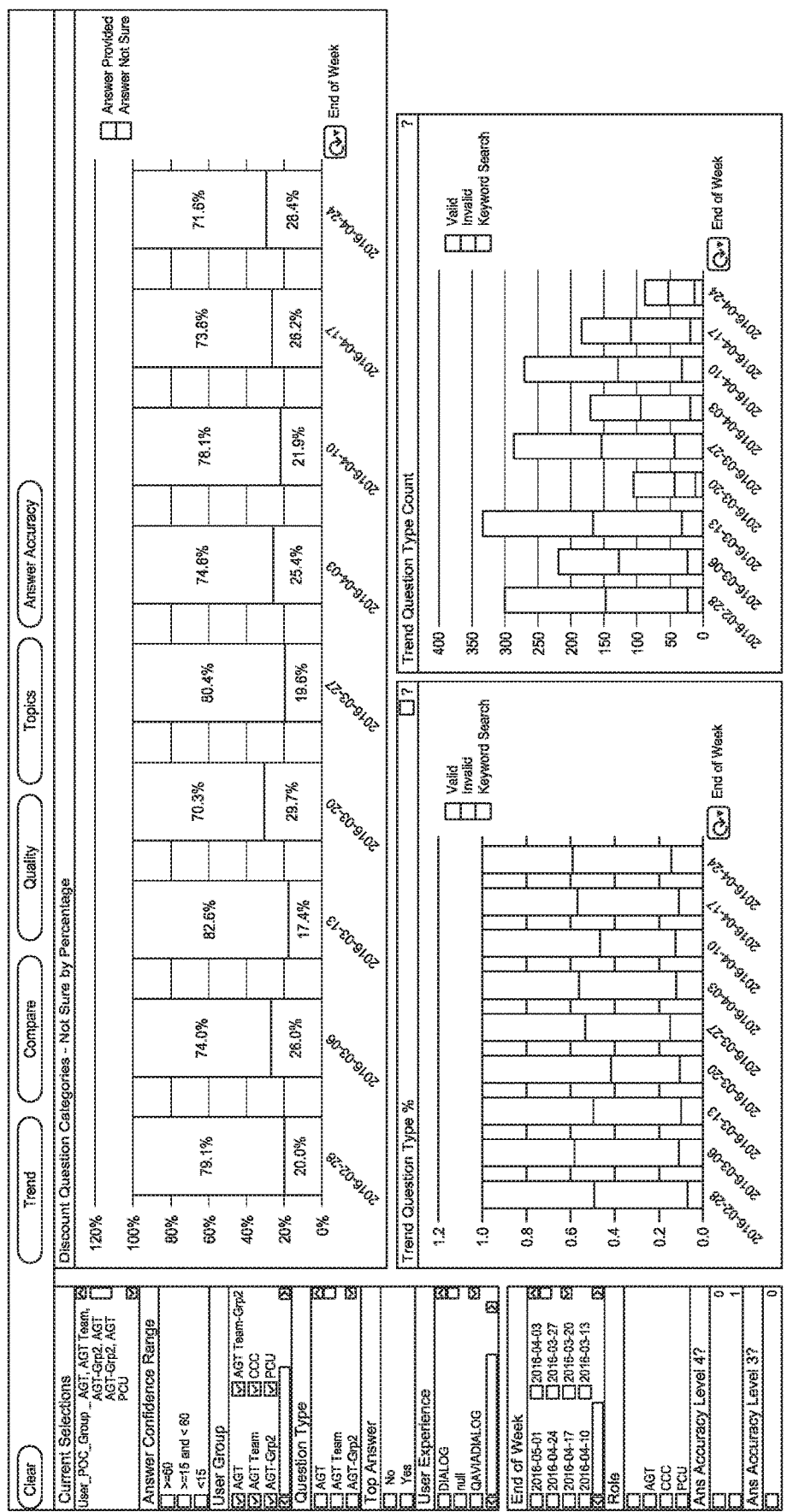
FIG. 4 is a depiction of an exemplary second display in a user interface communicating information about the performance of the question answering cognitive computing tool.

The metrics communicated on the dashboard 32 may include trends over time, comparisons, quality and consistency, and answer accuracy. In more detail, referring to FIG. 4, another page 310 of the dashboard 32 may include metrics regarding trends over time (e.g., were the questions valid, how often was the cognitive computing tool unable to provide an answer), as shown in 312. The dashboard 32 may also present selectable filters to allow users to view particular data of interest, as shown in 314.

Figure 5:
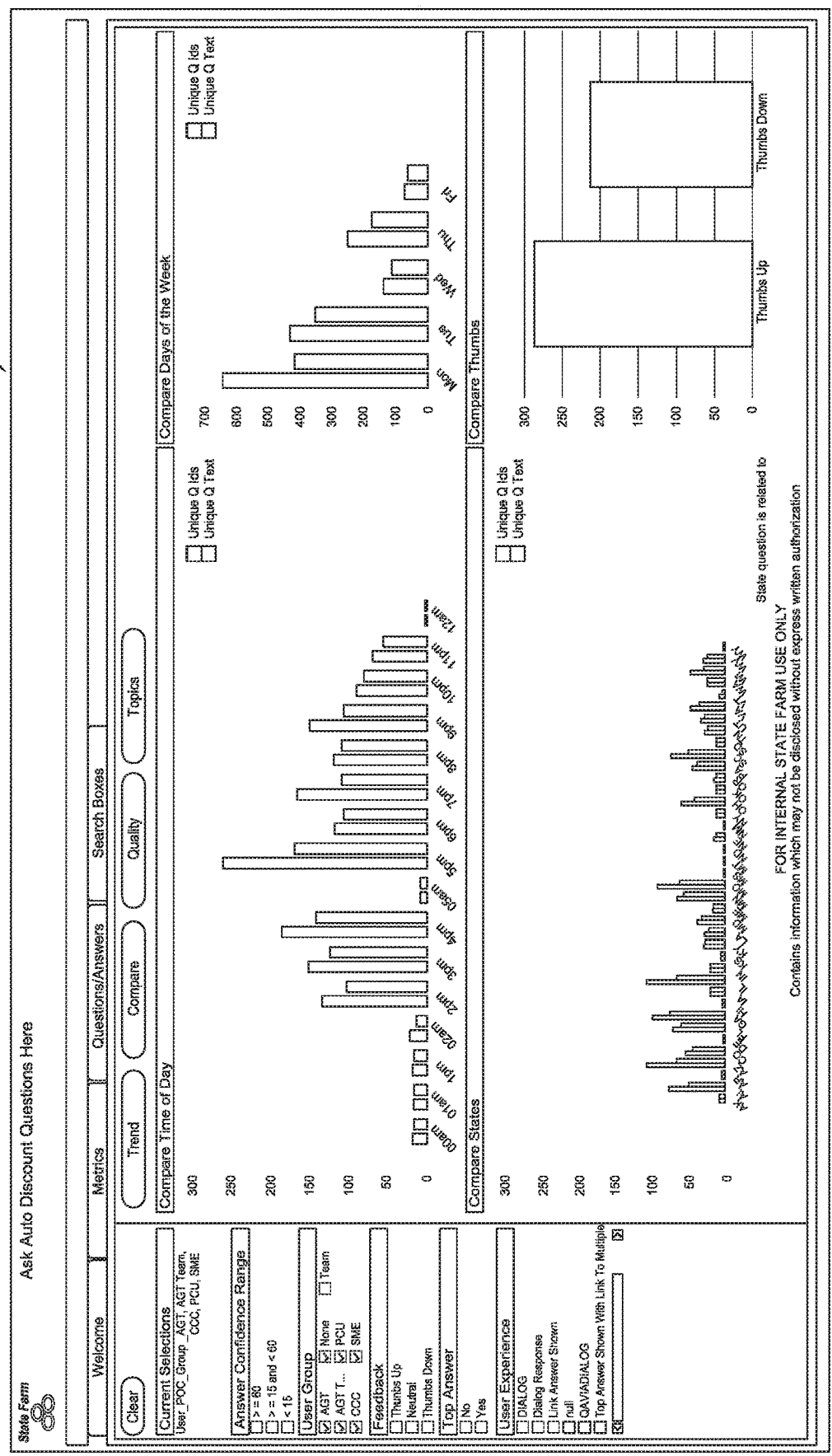
FIG. 5 is a depiction of an exemplary third display in a user interface communicating information about the performance of the question answering cognitive computing tool.

Referring to FIG. 5, another exemplary page 410 of the dashboard 32 may include metrics regarding comparisons (e.g., at what day and time and from what state or other location did the questions originate, and any feedback provided by users), as shown in 412. The dashboard 32 may also present selectable filters to allow users to view particular data of interest, as shown in 414.

Figure 6:
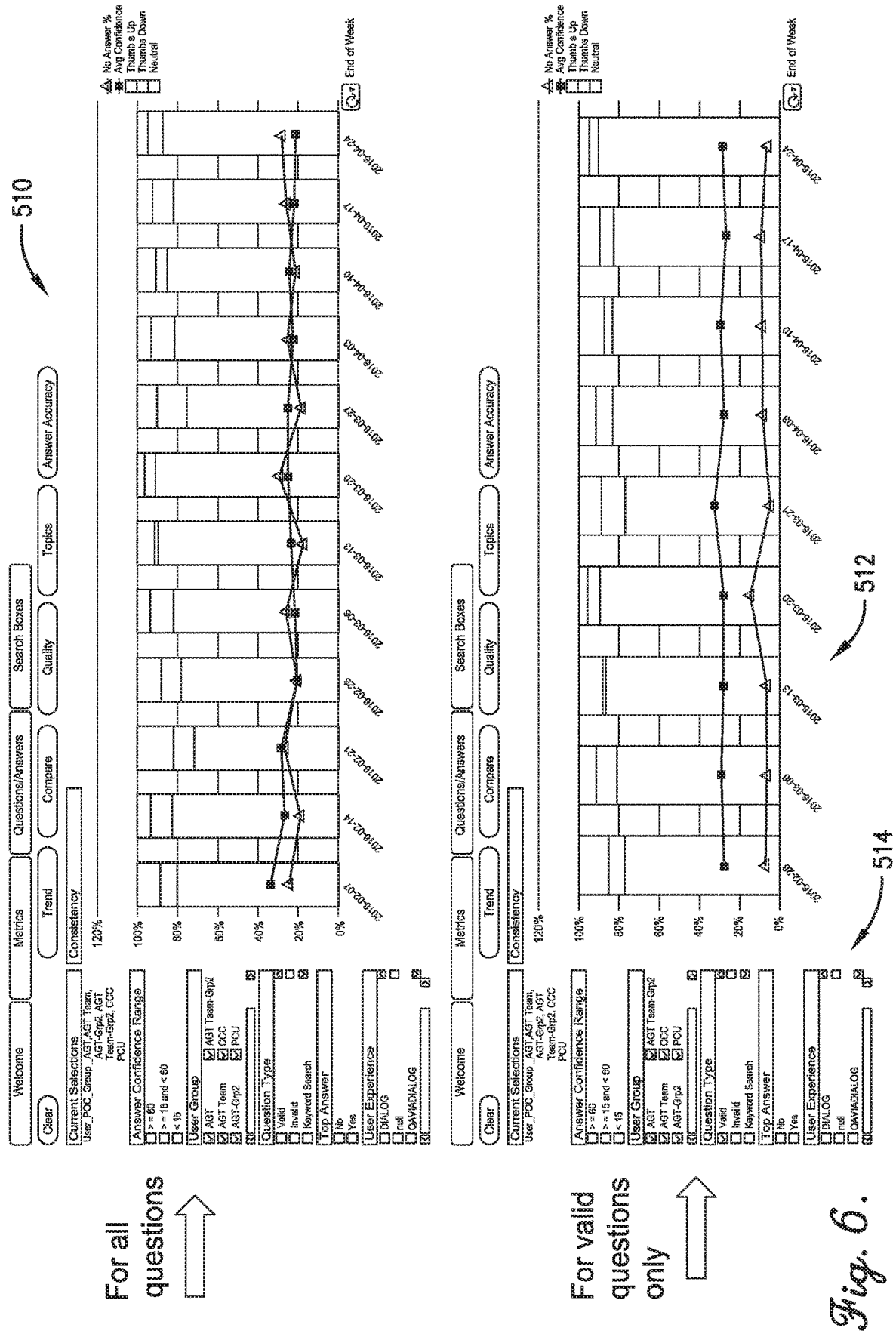
FIG. 6 is a depiction of an exemplary fourth display in a user interface communicating information about the performance of the question answering cognitive computing tool.

Referring to FIG. 6, another exemplary page 510 of the dashboard 32 may include metrics regarding the quality and consistency of the answers given (for all questions and/or only valid questions), as shown in 512. For example, the numerical rating of the accuracy of the answers may be compared to the confidence rating provided by the cognitive computing tool itself. One set of comparisons may involve whether the confidence rating is changing over time, including whether the confidence rating is increasing over time with the accuracy of the answers. The dashboard 32 may also present selectable filters to allow users to view particular data of interest, as shown in 514.

Figure 7:
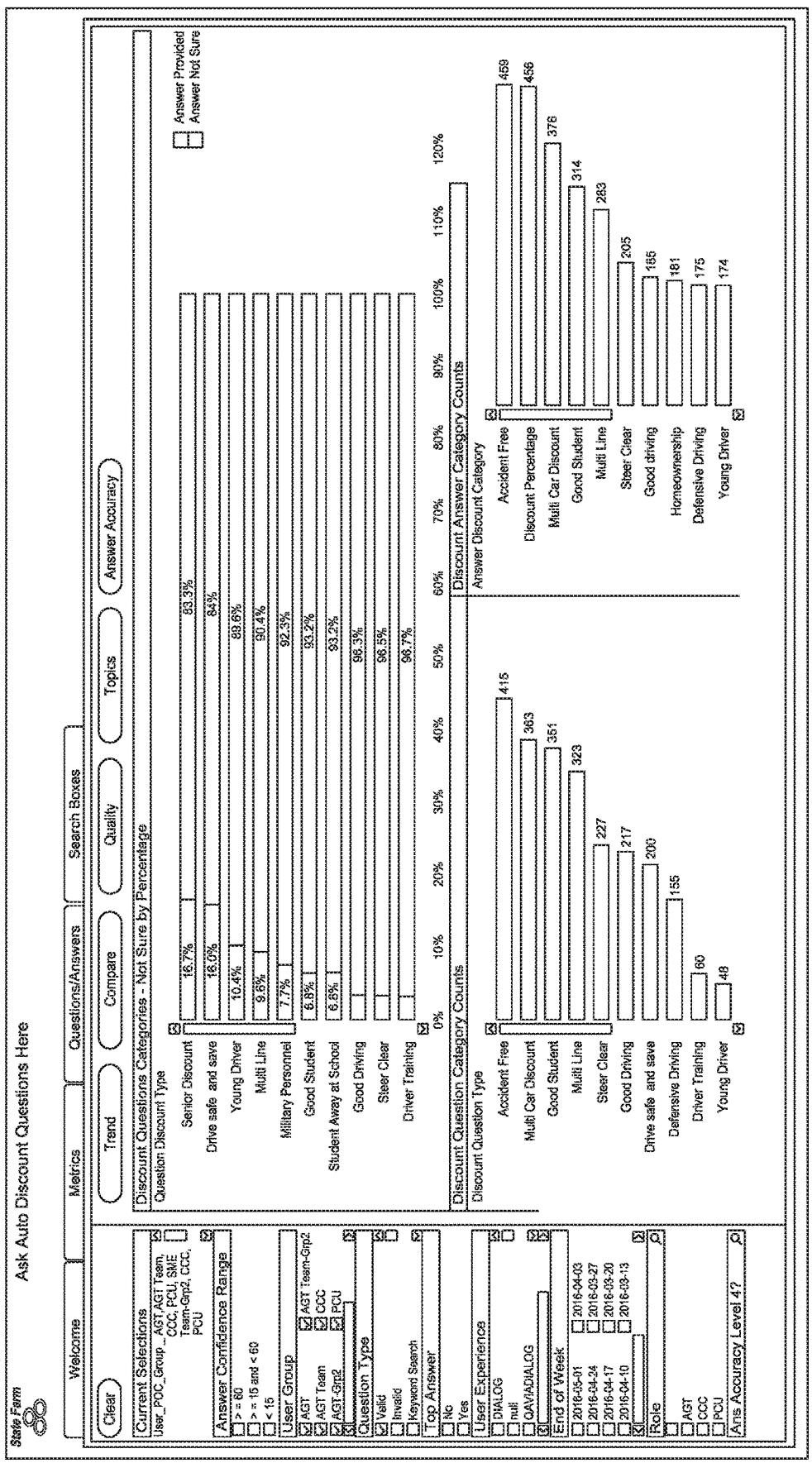
FIG. 7 is a depiction of an exemplary fifth display in a user interface communicating information about the performance of the question answering cognitive computing tool.

Referring to FIG. 7, another exemplary page 610 of the dashboard 32 may include metrics regarding the categories of questions and/or answers, as shown in 612. The dashboard 32 may also present selectable filters to allow users to view particular data of interest, as shown in 614.

Figure 8:
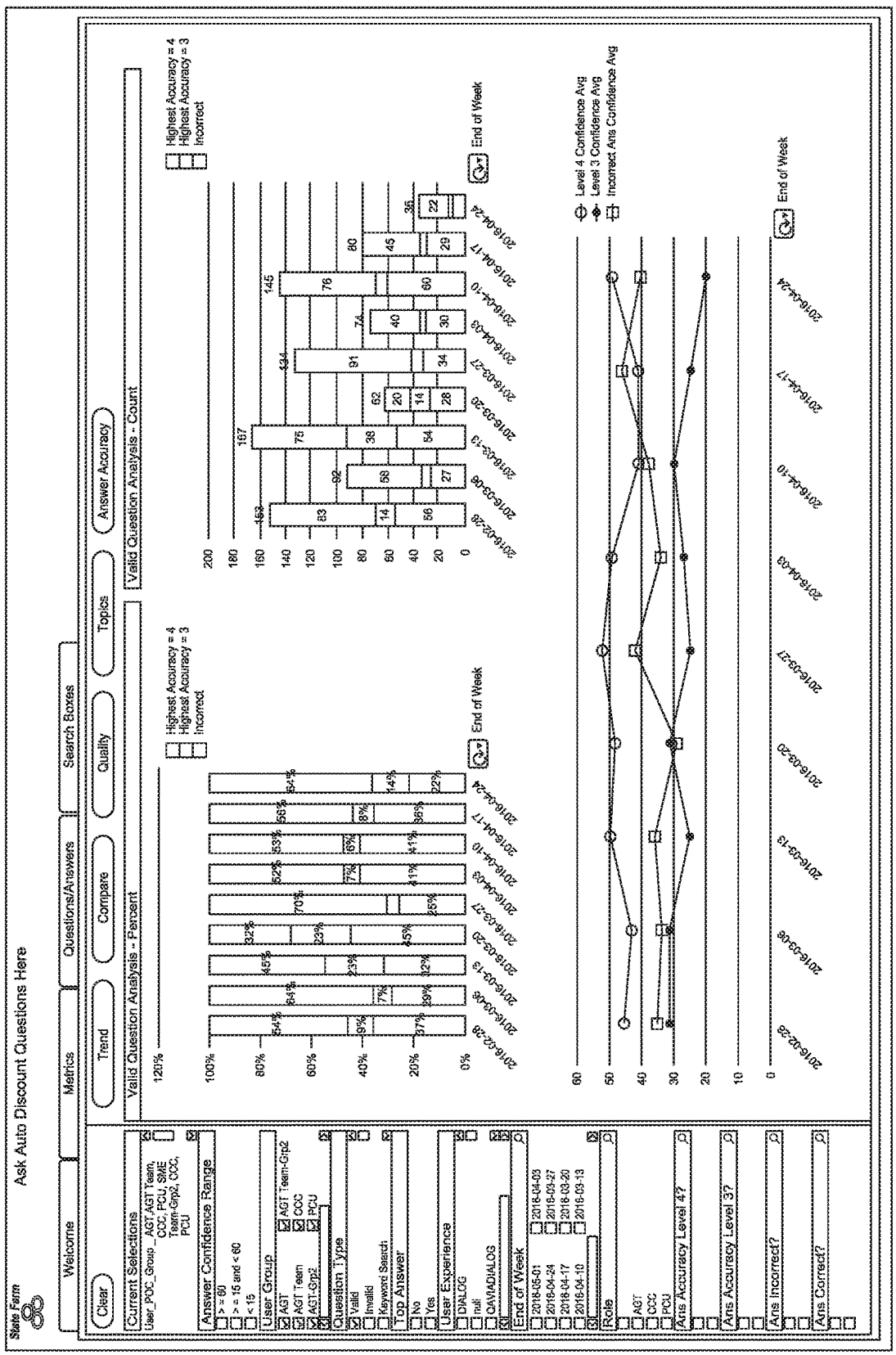
FIG. 8 is a depiction of an exemplary sixth display in a user interface communicating information about the performance of the question answering cognitive computing tool.

Referring to FIG. 8, another exemplary page 710 of the dashboard 32 may include metrics regarding the accuracy of the answers given, as shown in 712. The lower chart 712 in FIG. 8 compares confidence of the cognitive tool to an accuracy rating generated by the subject matter expert. The dashboard 32 may also present selectable filters to allow users to view particular data of interest, as shown in 714.

Figure 9:
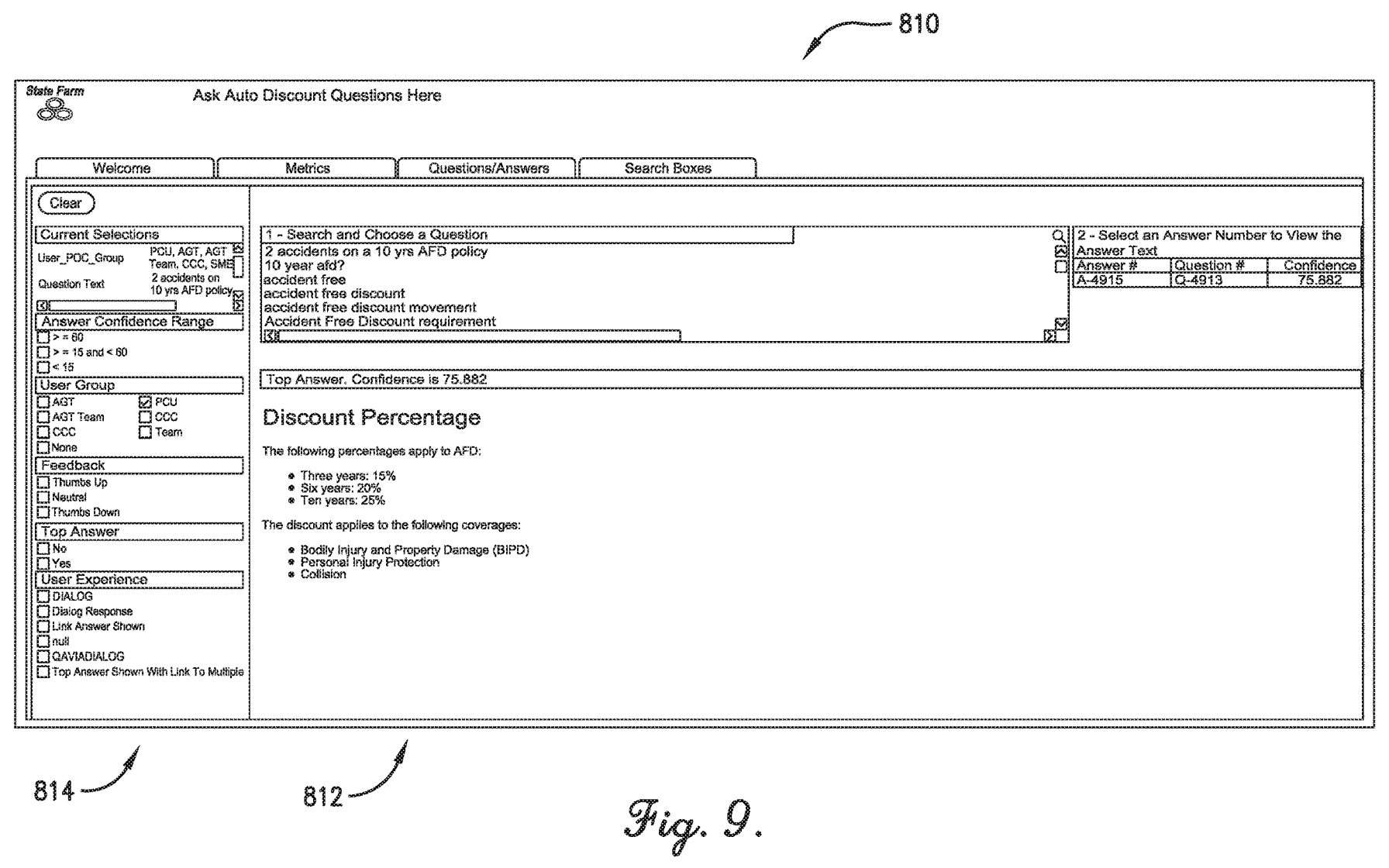

Additional details communicated in the dashboard 32 may include the formatted questions and/or answers, and additional information from the log files. In more detail, referring to FIG. 9, another page 810 may draw on the html mark-up contained in the log files to show how the cognitive computing tool formatted the questions and/or answers and what they actually look like to the users, as shown in 812. The dashboard 32 may also present selectable filters to allow users to view particular data of interest, as shown in 814.

Figure 10:
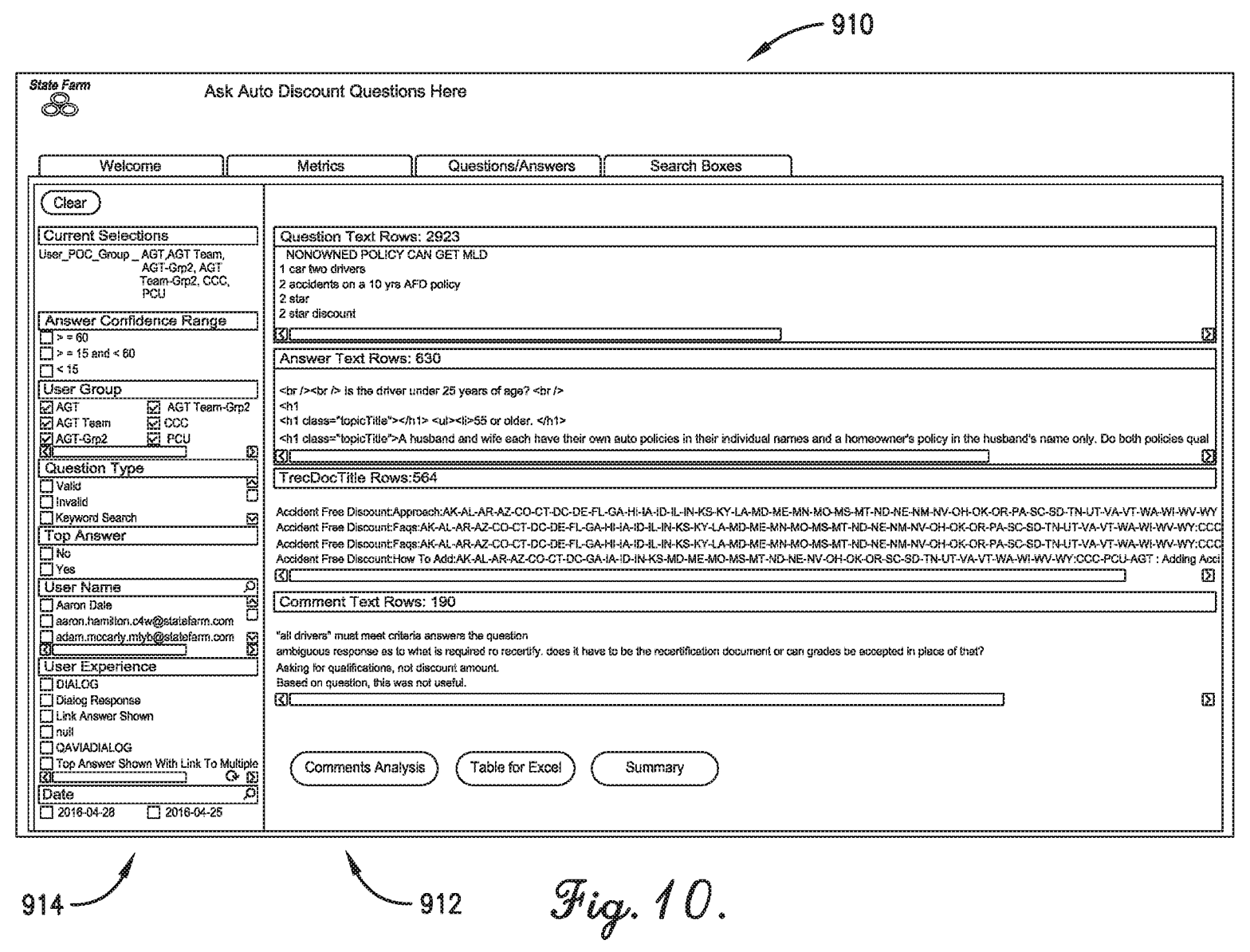

Referring to FIG. 10, another exemplary page 910 may include additional information from the log files, such as the questions, answers, document titles, and comments, as shown in 912. The dashboard 32 may also present selectable filters to allow users to view particular data of interest, as shown in 914.

Additional or alternative useful or otherwise relevant pages and/or information may be included in the dashboard 32.

III. Exemplary Computer-Readable Medium

Referring again to FIG. 2, an embodiment of a non-transitory computer-readable medium with an exemplary executable computer program stored thereon is shown for evaluating the cognitive computing tool 22. The non-transitory computer-readable medium with the executable computer program stored thereon may make use of the various components of the system 20 within the above-described exemplary operating environment. The executable program may broadly instruct certain components of the system 20 to perform the method 110 as follows.

A log file stored in the electronic memory 26 for the cognitive computing tool 22 may be accessed, as shown in 112. The log file may include a plurality of questions asked by one or more users and/or user groups, at least one answer from the tool 22 to each question, and a confidence rating assigned by the tool 22 to the answer to each question. The log file may further include an alias for each user, a timestamp associated with each question, an alternative answer for each question provided by the cognitive computing tool 22, feedback provided by the users, and/or free text comments provided by the users.

Each question may be analyzed to determine a validity of the question, and the results may be added to the log file to create an augmented log file stored in the electronic memory 26, as shown 114. Analyzing the questions may be performed by an expert in the subject matter of each question. Each answer may be analyzed to determine an accuracy of the answer, and the results may be added to augmented log file, as shown in 116. Analyzing the answers may also be performed by an expert in the subject matter of each question. Analyzing the answers may include assigning a numerical accuracy rating to the accuracy of the answer. Each question may be analyzed using a text analytics tool to determine a category of the question, and the results may be added to the augmented log file, as shown in 118.

The method 110 may further include analyzing one or more comments by the users, and adding the analysis of the comments to the augmented log file, as shown in 120. The method may further include analyzing one or more sentiments of the users, and adding the analysis of the sentiments to the augmented log file, as shown in 122. The method 110 may further include adding additional data associated with the users to the augmented log file, as shown in 124. This may involve accessing demographic data about the users and adding the demographic data to the augmented log file, adding an identity of each user to the augmented log file, and/or adding a location of each user to the augmented log file.

At least some of the data contained in the augmented log file may be formatted by the electronic processor 28 and visually communicated on the electronic display 30 as one or more metrics describing the performance of the cognitive computing tool 22, as shown in 126. The metrics may include a trend over time regarding the accuracy of the answers provided by the tool 22. The metrics may include comparisons of the answers to each question, and the comparisons may include the numerical accuracy rating assigned to the accuracy of each answer compared to the confidence rating assigned to each answer. The method 110 may further include visually communicating the answers in the formats with which they were communicated to the users, as shown in 128.

The method 110 may further include providing one or more electronic filters which are selectable to cause the electronic processor 28 to electronically filter the at least some of the data visually communicated on the electronic display 30, as shown in 130.

The executable program stored on the non-transitory computer-readable medium may instruct the system to perform more, fewer, or alternative actions, including those discussed elsewhere herein, and particularly those discussed in the section describing the computer-implemented method.

V. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor implemented. For example, at least some of the operations of a method may be performed by one or more processors or processor-implemented hardware modules. The performance of certain operations may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some exemplary embodiments, the one or more processors or processor implemented modules may be located in a single geographic location (e.g., within a home environment, an office environment, or a server farm). In other exemplary embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112, sixth paragraph.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

We claim:

1. A computer-implemented method for providing a cognitive computing tool configured to provide at least one answer to each question of a plurality of questions, the computer-implemented method comprising:
   accessing a log file including the plurality of questions, and a confidence rating assigned by the cognitive computing tool to the at least one answer to each question;
   determining a validity of each question, by an expert in a subject matter of each question, and adding the validity to the log file to create an augmented log file;
   determining an accuracy of the at least one answer to each question, and adding the accuracy to the augmented log file;
   determining a category of each question using a text analytics tool, and adding the category of each question to the augmented log file; and
   formatting by an electronic processor and visually communicating on an electronic display a representation of at least some data contained in the augmented log file as one or more metrics describing performance of the cognitive computing tool.

2. The computer-implemented method as set forth in claim 1, wherein determining the accuracy of the at least one answer to each question is performed by an expert in the subject matter of each question.

3. The computer-implemented method as set forth in claim 1, further comprising assigning a numerical accuracy rating to the accuracy of the at least one answer to each question.

4. The computer-implemented method as set forth in claim 1, further including analyzing one or more comments by one or more users, and adding an analysis of the one or more comments to the augmented log file.

5. The computer-implemented method as set forth in claim 1, further including analyzing one or more sentiments of one or more users and adding an analysis of the one or more sentiments to the augmented log file.

6. The computer-implemented method as set forth in claim 1, wherein the log file further includes an alias for each user of one or more users, a timestamp associated with each question of the plurality of questions, an alternative answer to each question of the plurality of questions provided by the cognitive computing tool, one or more feedbacks provided by the one or more users, and one or more free text comments provided by the one or more users.

7. The computer-implemented method as set forth in claim 1, wherein the one or more metrics include a trend over time regarding the accuracy of the at least one answer for each question provided by the cognitive computing tool.

8. The computer-implemented method as set forth in claim 1, wherein the one or more metrics includes one or more comparisons of the at least one answer to each question of the plurality of questions.

9. The computer-implemented method as set forth in claim 8, wherein the one or more comparisons include comparing a numerical accuracy rating assigned to the accuracy of each answer to a confidence rating assigned to each answer.

10. The computer-implemented method as set forth in claim 1, further including adding additional data associated with each user of one or more users to the augmented log file.

11. The computer-implemented method as set forth in claim 10, wherein adding the additional data includes adding demographic data about the one or more users to the augmented log file.

12. The computer-implemented method as set forth in claim 10, wherein adding the additional data includes adding an identity of each user of the one or more users to the augmented log file.

13. The computer-implemented method as set forth in claim 10, wherein adding the additional data includes adding a location of each user of the one or more users to the augmented log file.

14. The computer-implemented method as set forth in claim 1, further including visually communicating the at least one answer in a format with which it was communicated to a user.

15. The computer-implemented method as set forth in claim 1, further including providing one or more electronic filters which are selectable to cause the electronic processor to electronically filter the at least some of the data visually communicated on the electronic display.

16. A system for evaluating performance of a cognitive computing tool, the system comprising:
   an electronic memory containing an augmented log file for the cognitive computing tool, wherein the augmented log file includes:
      a plurality of questions, and a confidence rating assigned by the cognitive computing tool to at least one answer to each question,
      a validity of each question of the plurality of questions as determined by an expert in a subject matter of each question, and
      an accuracy of each answer of the at least one answer to each question;
   an electronic processor configured to determine a category of each question of the plurality of questions using a text analytics tool, and to add the category of each question to the augmented log file; and
   an electronic display configured to communicate a representation of at least some data contained in the augmented log file as one or more metrics describing the performance of the cognitive computing tool.

17. The system as set forth in claim 16, wherein the accuracy of each answer is determined by an expert in a subject matter of each answer.

18. The system as set forth in claim 16, wherein the one or more metrics include a trend over time regarding the accuracy of the at least one answer for each question.

19. A non-transitory computer readable storage medium with a computer program stored thereon for evaluating performance of a cognitive computing tool, wherein the computer program is configured to instruct a system to perform actions comprising:
   accessing a log file stored in an electronic memory for the cognitive computing tool, wherein the log file includes a plurality of questions, and a confidence rating assigned by the cognitive computing tool to at least one answer to each question;
   determining a validity of each question, and adding the validity to the log file to create an augmented log file;
   determining an accuracy of each answer of the at least one answer to each question, and adding the accuracy to the augmented log file;
   using a text analytics tool to determine a category of each question, and adding the category of each question to the augmented log file stored; and
   formatting by an electronic processor and visually communicating on an electronic display a representation of at least some data contained in the augmented log file as one or more metrics describing the performance of the cognitive computing tool including a trend over time regarding the accuracy of the at least one answer to each question provided by the cognitive computing tool.

20. The non-transitory computer readable storage medium set forth in claim 19, wherein the computer program is further configured to instruct a system to assign a numerical accuracy rating to the accuracy of each answer to each question.

* * * * *